United States Patent
Dumas-Brown et al.

(10) Patent No.: US 7,890,421 B2
(45) Date of Patent: Feb. 15, 2011

(54) SYSTEM AND METHOD FOR ADMINISTERING MULTIPLE LINES OF CREDIT

(75) Inventors: Nicholas Peter Dumas-Brown, Wheeling, IL (US); Jeffrey Thomas Bielski, Lake Barrington, IL (US)

(73) Assignee: Discover Financial Services LLC, Riverwoods, IL (US)

( * ) Notice: Subject to any disclaimer, the term of this patent is extended or adjusted under 35 U.S.C. 154(b) by 0 days.

(21) Appl. No.: 11/936,486

(22) Filed: Nov. 7, 2007

(65) Prior Publication Data

US 2009/0119202 A1    May 7, 2009

(51) Int. Cl.
G06Q 40/00    (2006.01)
(52) U.S. Cl. ......................................... 705/39
(58) Field of Classification Search .......... 705/39, 705/35, 38, 42
See application file for complete search history.

(56) References Cited

U.S. PATENT DOCUMENTS

| | | | | |
|---|---|---|---|---|
| 5,953,710 | A * | 9/1999 | Fleming | 705/38 |
| 6,032,134 | A | 2/2000 | Weissman | |
| 6,038,552 | A | 3/2000 | Fleischl et al. | |
| 6,353,811 | B1 | 3/2002 | Weissman | |
| 7,092,905 | B2 * | 8/2006 | Behrenbrinker et al. | 705/39 |
| 7,383,224 | B2 * | 6/2008 | Huennekens et al. | 705/39 |
| 7,401,731 | B1 * | 7/2008 | Pletz et al. | 235/380 |
| 7,406,442 | B1 | 7/2008 | Kottmeier, Jr. et al. | |
| 7,472,090 | B1 * | 12/2008 | White | 705/38 |
| 2002/0143647 | A1 | 10/2002 | Headings et al. | |
| 2002/0156723 | A1 * | 10/2002 | Lilly et al. | 705/38 |
| 2002/0194122 | A1 * | 12/2002 | Knox et al. | 705/39 |
| 2003/0004868 | A1 * | 1/2003 | Early et al. | 705/39 |
| 2005/0234789 | A1 | 10/2005 | Czyzewski et al. | |
| 2006/0097036 | A1 * | 5/2006 | Koenigsman et al. | 235/379 |
| 2006/0106691 | A1 * | 5/2006 | Sheaffer | 705/35 |
| 2006/0259362 | A1 * | 11/2006 | Cates | 705/14 |
| 2007/0027799 | A1 * | 2/2007 | Manelis et al. | 705/38 |
| 2007/0040015 | A1 | 2/2007 | Carlson et al. | |
| 2007/0239614 | A1 * | 10/2007 | Tannenbaum et al. | 705/53 |
| 2008/0016003 | A1 * | 1/2008 | Hutchison et al. | 705/67 |
| 2008/0109358 | A1 | 5/2008 | Kottmeier, Jr. et al. | |

* cited by examiner

*Primary Examiner*—James P Trammell
*Assistant Examiner*—Elda Milef
(74) *Attorney, Agent, or Firm*—Leydig, Voit & Mayer, Ltd.

(57) ABSTRACT

Ways are provided to allow a credit card issuing financial institution and the card member to customize a credit card account by defining an unlimited number of special-purpose lines of credit, while maintaining the overall risk at or below the overall line of credit. The individual specialized lines of credit share the overall line of credit, where the total amount of credit actually extended to the card member based on one or more of the specialized lines of credit is limited by the overall line of credit. To provide flexibility in allocating credit toward a plurality of different expenses, the sum of all of the individual lines of credit is preferably greater than the overall line of credit. Therefore, numerous special-purpose lines of credit are created for promotional, budgetary, fraud prevention, or other purposes, without negatively affecting the consumer's credit profile and/or credit score.

21 Claims, 4 Drawing Sheets

| Credit Line Type | Credit Limit |
|---|---|
| Balance Transfer | $5k |
| Cash Advance | $5k |
| Merchandise | $5k |
| Purchase Type 1 | $1k (promotional) |
| Purchase Area 1 | $10k (home area) |
| Purchase Area 2 | $1k (outside of home area) |
| Purchase Type 2 | $500 ("junk food") |
| Purchase Type 3 | $500 ("charity") |
| Overall Line of Credit | $10k |

FIGURE 2

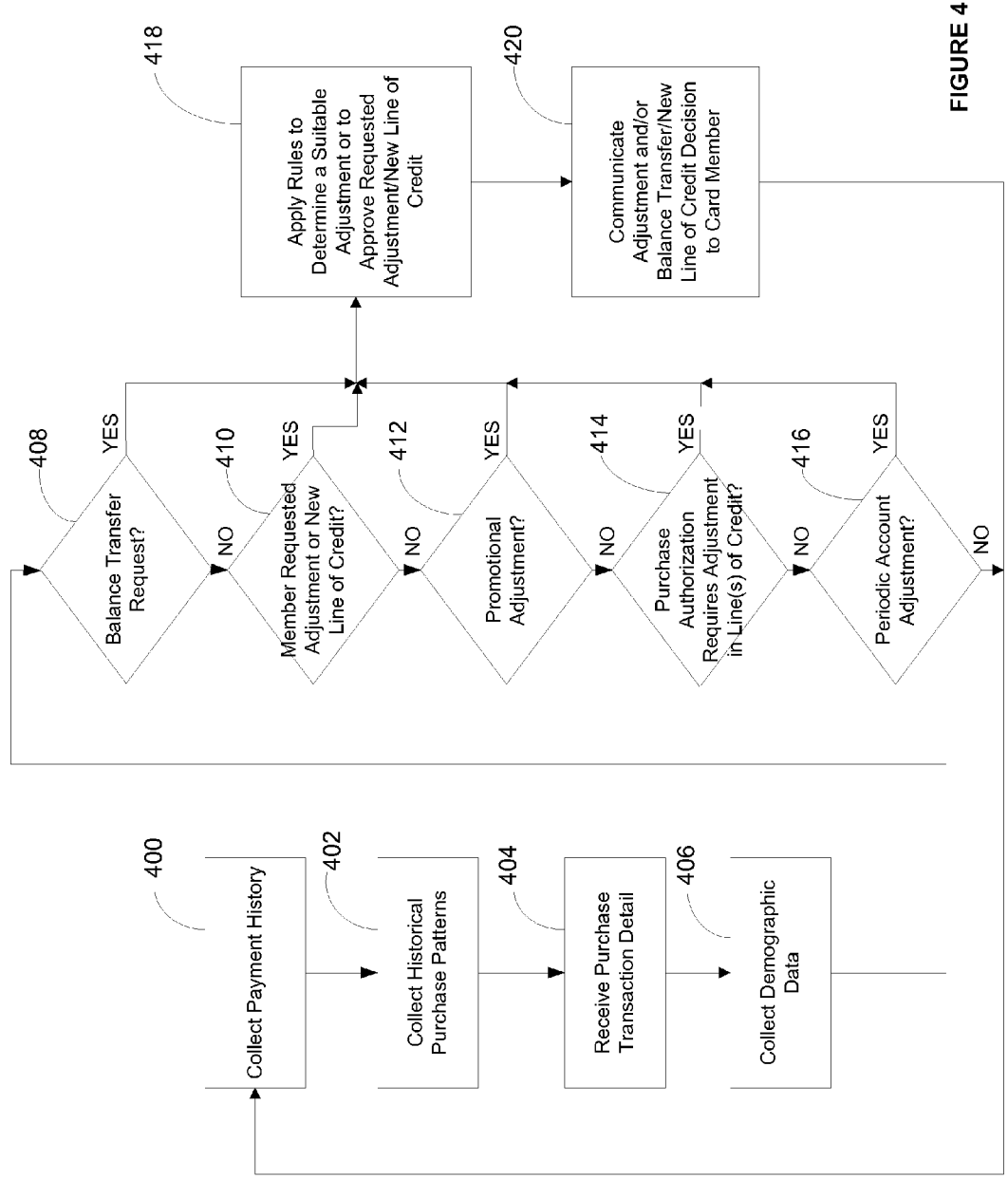

SYSTEM AND METHOD FOR ADMINISTERING MULTIPLE LINES OF CREDIT

FIELD OF THE INVENTION

This invention pertains generally to the field of electronic credit card transactions and more particularly to administering consumer credit card accounts in connection with such transactions.

BACKGROUND

A typical consumer credit card account is structured as a single line of credit, which sets an overall cap, or credit limit, on the amount of credit to be extended to the consumer. The maximum credit limit associated with a typical credit card account, in turn, consists of three subcomponents, or "components of balance," namely, a merchandise credit limit, a cash advance credit limit, and a balance transfer credit limit. The merchandise credit limit typically equals the maximum credit limit extended to the consumer, while the cash advance and balance transfer limits each constitute a percentage of the overall line of credit.

This typical consumer credit line structure, however, lacks the necessary flexibility to fully take advantage of each of the balance transfer and cash advance features of consumer credit. For example, if a consumer maxes out his or her merchandise credit limit, he or she is no longer able to take advantage of balance transfers or receive cash advances because the balance transfer and cash advance limits are part of the sole line of credit. Similarly, when a large cash advance is necessary in case of an emergency, a consumer with a maxed out merchandise credit limit is not able to cover the necessary cash expenses. The above lack of flexibility in consumer credit card account structure also negatively impacts the credit card issuer's ability to market promotional purchases, as well as promotional balance transfer and cash advance rates, in cases when the consumer's outstanding balance is either close to or is at the maximum credit limit. Overall, the shared line of credit account structure limits a credit card issuer's marketing options by allocating the available credit limit to one type of credit at the expense of another. Although a credit card issuer is typically able to raise the consumer's maximum credit limit, such activity may negatively impact the consumer's credit profile.

BRIEF SUMMARY OF THE INVENTION

Ways are provided to allow a credit card issuing financial institution and, in one embodiment, the card member, to customize a credit card account by defining an unlimited number of special-purpose lines of credit, while maintaining the overall risk at or below the overall line of credit. The individual specialized lines of credit share the overall line of credit, where the total amount of credit actually extended to the card member based on one or more of the specialized lines of credit is limited by the overall line of credit. To encourage consumer behavior with respect to a plurality of promotional expenses, the sum of all of the individual lines of credit is preferably greater than the overall line of credit. Therefore, numerous promotional and special-purpose lines of credit are created without negatively affecting the card member's credit profile and/or credit score. In embodiments, the improved account structure also allows creation of special-purpose lines of credit for budgetary, fraud prevention, and risk management purposes.

In one aspect, a method is provided for encouraging particular behavior by a consumer in connection with a consumer financial account associated with a credit card and a plurality of credit lines including an overall credit line and at least one specialized credit line, each of the credit lines comprising a limit, the method comprising receiving financial information associated with the consumer, processing the financial information to determine a suitable adjustment for the consumer, and automatically adjusting the limit for at least one of the specialized credit lines associated with the financial account from a first limit to a second limit in accordance with the determined suitable adjustment.

In another aspect, a system is provided for encouraging particular behavior by a consumer in connection with a consumer financial account associated with a credit card and a plurality of credit lines including an overall credit line and at least one specialized credit line, each of the credit lines comprising a limit, the system comprising a database for storing financial information associated with the consumer, a server having stored thereon computer executable instructions for processing the financial information to determine a suitable adjustment for the consumer, and automatically adjusting the limit for at least one of the specialized credit lines associated with the financial account from a first limit to a second limit in accordance with the determined suitable adjustment.

BRIEF DESCRIPTION OF THE SEVERAL VIEWS OF THE DRAWING(S)

While the appended claims set forth the features of the present invention with particularity, the invention and its advantages are best understood from the following detailed description taken in conjunction with the accompanying drawings, of which:

FIG. 2 is a table illustrating the card member account of FIG. 1 having individually controlled lines of credit, in accordance with an embodiment of the invention;

FIG. 4 is a flow chart illustrating an embodiment of a method for administering a plurality of specialized lines of credit of FIG. 2.

DETAILED DESCRIPTION OF THE INVENTION

Figure 1:
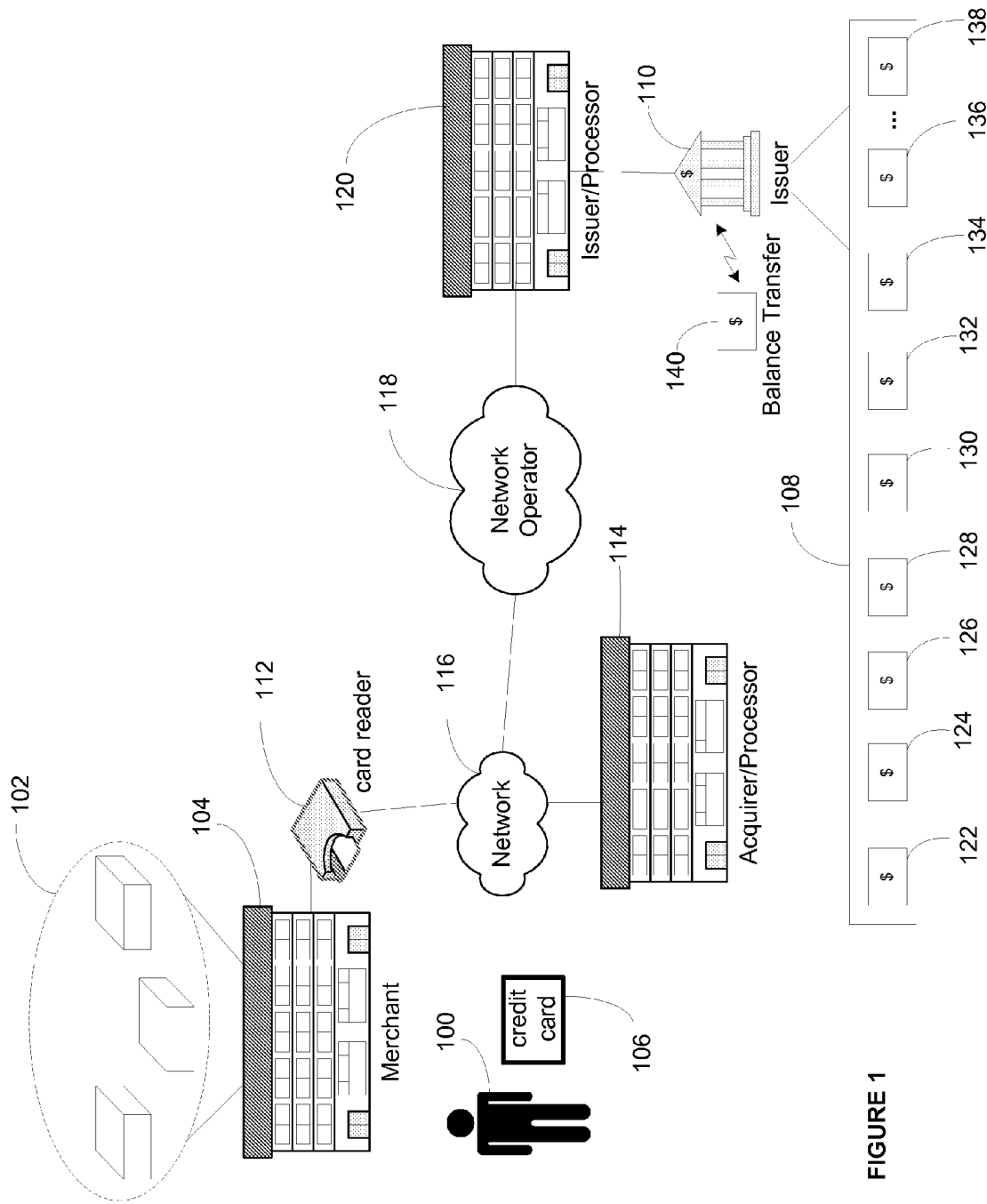
FIG. 1 is a diagram illustrating an implementation of a system contemplated by an embodiment of the invention.

Turning to FIG. 1, an implementation of a system contemplated by an embodiment of the invention is shown with reference to an overall credit card transaction network environment. A card member 100 wishes to purchase several products 102 from a merchant 104 using a credit card 106. The credit card 106 is linked to an account 108, preferably held or managed by an issuing financial institution 110. Although the merchant 104 is typically a brick-and-mortar store, such as a supermarket, or any store capable of accepting payment via a credit card 106, the merchant 104 can also be located remotely, such as in the case of transactions taking place over the telephone or Internet. During a typical credit card transaction, the merchant 104 accepts payment for the products 102 by receiving the account information associated with the card 106 via a card reader 112, or via a telephone or Internet, and submits the transaction to acquirer/processor 114 for authorization. Typically, transactions using the card 106 are transmitted over a transaction network 116, operated in conjunction with a network operator 118, such as the DISCOVER NETWORK. In one embodiment, the transaction network 116 includes connections to one or more additional financial transaction networks, such as VISA and/or MASTERCARD networks. The acquirer/processor 114, in turn, verifies the card member's account information and transaction amount with the issuer/processor 120 and/or the issuing institution 110 in order to authorize the payment transaction. The acquirer/processor 114 periodically receives batch transaction records from the merchant 104 and forwards the transaction records to the issuer/processor 120, via the network 116, for payment by the issuing financial institution 110. The acquirer/processor 114 pays the merchant 104 upon deducting a predetermined transaction fee. Upon processing the credit card transaction associated with the card member's account 100, the issuing institution 110 debits the card member's account 108 in the amount of the payment transaction.

To encourage consumer decisions with respect to specific purchases, the card member account 108 comprises a plurality of individually controlled lines of credit, such as the lines of credit 122-136 associated with balance transfers, cash advances, merchandise purchases, purchase locations, and specific purchase types, products, retailers, and the like, where the total amount of credit extended to the card member 100 in connection with one or more of the multiple lines of credit 122-136 does not exceed an overall line of credit 138. To accommodate a variety of purchase promotions, the issuing institution 110 preferably employs a rules-based engine to continuously create additional specialized lines of credit, as well as to adjust credit line limits and/or interest rates for at least some of the individual credit lines 122-138, based on predetermined conditions. In one embodiment, the issuing institution 110 automatically reduces a balance transfer line of credit 122 to zero without effect on the remaining lines of credit 124-138 when a card member is deemed ineligible for balance transfer 140, thereby preventing the card member from completing the balance transfer 140. In another embodiment, the issuing institution 110 allows the card member 100 to set limits associated with purchase types and/or purchase locations in order to meet budgetary, lifestyle, or charitable purposes, for example, or to reduce the risk associated with credit card theft and/or fraud.

Turning to FIG. 2, an embodiment of the card member account 108 is shown in more detail with respect to the individually controlled lines of credit 122-138. The individual lines of credit 122-136 share the overall line of credit 138 where the total amount of credit actually extended to the card member 100 based on one or more of the lines of credit 122-136 is limited by the overall line of credit 138. To provide flexibility in allocating credit toward a plurality of different expenses, the sum of all of the individual lines of credit 122-136 is preferably greater than the overall line of credit 138. This allows the issuing financial institution 110 and/or the card member 100 to customize the credit card account 108 by defining an unlimited number of special-purpose lines of credit, while maintaining the overall risk at or below the overall line of credit 138. Therefore, numerous special-purpose lines of credit are created for promotional, budgetary, fraud prevention, or other purposes, without negatively affecting the consumer's risk profile and/or credit score.

In the illustrated embodiment, the card member 100 is provided with a balance transfer, cash advance, and merchandise lines of credit 122-126, each set at five thousand dollars, while the overall line of credit 138 is limited to ten thousand dollars. Therefore, the card member 100 may be able to, for example, request a five thousand dollar balance transfer 122, receive a two thousand dollar cash advance 124, and purchase merchandise or services 126 in the amount of three thousand dollars before reaching the overall credit limit 138 of ten thousand dollars. In this embodiment, the issuing financial institution 110 provides the card member 100 with additional custom lines of credit, such as those dedicated to promotional purchases from certain retailers and/or based on certain purchase types (e.g., electronics from retailer A or automotive merchandise from manufacturer B, etc), wherein the credit lines associated with promotional purchase types may include one or more incentives by way of favorable financing rates, for example. In one embodiment, the issuing institution 110 imposes a limited time, or window of opportunity, for the card member 110 to take advantage of the lines of credit associated with promotional purchase types, retailers, and/or products, where the promotional line of credit is no longer available after a predetermined period of time (e.g., after the promotional period). In another embodiment, the issuing financial institution 110 temporarily increases the card member's credit limit (and/or lowers the interest rate) associated with a promotional purchase type to allow the card member 100 to take advantage of the promotion. Alternatively or in addition, the issuing institution 110 makes permanent additions to the plurality of individually controlled lines of credit associated with the credit card account 108. In yet another embodiment, the issuing institution 110 also allows the card member 100 to create additional custom lines of credit (e.g., via a secure online interface), while maintaining control of the overall line of credit 138. Consequently, an unlimited number of lines of credit 122-136, both permanent and temporary, are available to the card member 100 as long as the total amount of credit extended to the card member at any given point in time, as pooled between one or more lines of credit, does not exceed the overall line of credit 138.

Preferably, the issuing institution 110 employs a business rules engine application 300 (FIG. 3), running on one or more server computers and databases, to continuously evaluate the card member's financial information, including payment transaction information received from the merchant 104 in the course of a request for authorization of purchase of merchandise and/or services. The business rules engine 300 processes the payment transaction information and analyzes the card member's purchasing patterns, as well as the card member's credit score and payment history, among other factors. Based on the foregoing analysis, the issuing institution 110 opens an additional line of credit (within the bounds of the overall line of credit 138), raises or lowers a limit on any of the special-purpose lines of credit 122-136 (also within the bounds of the overall line of credit 138), or otherwise adjusts any of the independently adjustable lines of credit 122-136. To allocate purchases among the plurality of lines of credit 122-138, the issuing institution 110 preferably receives merchant and Stock Keeping Unit (SKU)-level information in connection with purchase authorizations and matches the authorized purchases with one or more special-purpose lines of credit 122-136 based on comparing the received merchant information and/or SKU numbers to a predetermined list of merchants and SKUs stored in a database. The issuing institution 110 then debits one or more of the identified lines of credit 122-136, as well as the overall line of credit 138, to calculate the remaining credit limits.

In order to encourage particular behavior by the card member 100, the issuing institution 110 employs the computerized business rules logic engine/application 300 that analyzes the card member's financial information to qualify the card member 100 for one or more promotional lines of credit 128. In one embodiment, the promotional line of credit 128 is associated with a specific purchase type, such as some or all purchases from a given retailer and/or certain categories of purchases, such as sports equipment, gas, or the like. For example, the issuing institution 110 may qualify the member 100 for a separate line of credit 128 dedicated to purchasing a big-screen TV, or another item of predetermined minimum value, from a specific retailer. Alternatively or in addition, the issuing institution 110 associates the promotional line of credit 128 with a specific item or range of items, such as "all TVs from manufacturer A," or "model X from manufacturer B." In yet another embodiment, the issuing institution 110 raises a limit on a promotional line of credit 128 dedicated to charitable donations in order to encourage giving during the holiday season. In yet another embodiment, the issuing institution 110 informs the member 100 of availability of a promotional line of credit 128 whereby a predetermined percentage of proceeds based on purchases of specifically-identified items (or all items from specific retailers) will be donated to a charity.

In an additional embodiment, the issuing financial institution 110 employs the rules-based business logic engine application 300 (FIG. 3) to determine whether a card member 100 is eligible for taking advantage of the balance transfer line of credit 122. In an embodiment, the balance transfer eligibility determination is made by periodically evaluating the card member's payment history, outstanding/revolving balance, and purchasing patterns, in order to allow the issuing institution 110 to proactively adjust the balance transfer line of credit 122, such as by adjusting the balance transfer credit limit up or down depending on the card member's current eligibility score, for example, or, if necessary, lowering the balance transfer credit limit to zero when the card member 100 is deemed ineligible for a balance transfer. Thus, the issuing institution 110 dynamically manages the risk of default due to a balance increase from balance transfers without affecting the overall line of credit 138. Therefore, if desired, the issuing institution 110 allows the card member 100 to continue taking advantage of some or all of the remaining lines of credit 124-136 even if the balance transfer credit limit is lowered to zero. Alternatively or in addition, the issuing institution 110 employs real-time business rules engine logic to automatically adjust the balance transfer credit limit (e.g., increase/decrease, or lower the balance transfer credit limit to zero) by evaluating card member's eligibility for balance transfers at the time of the balance transfer request, such as by receiving the request from the card member 100 via an online interface and making an automatic (real-time) eligibility decision followed by a corresponding adjustment of the balance transfer credit limit. The balance transfer credit limit adjustment permits the issuing institution 110 to manage the risk associated with large balance transfers without affecting the other special-purpose credit lines associated with the credit card account 108, thereby also allowing the card member 100 increased flexibility with respect to the remaining lines of credit. In yet another embodiment, pursuant to the card member's request, the issuing institution 110 manually increases a credit limit associated with one or more lines of credit, such as the balance transfer, cash advance, or merchandise lines of credit 122-126, while proportionally decreasing the limits on the remaining lines of credit.

As discussed above, an exemplary credit line structure of FIG. 2, includes an overall line of credit 138 set at ten thousand dollars, as well as balance transfer, cash advance, and merchandise lines of credit 122-126, set at five thousand dollars respectively. In the illustrated embodiment, the issuing institution 110 also allows the card member 100 to create customized lines of credit associated with the credit card account 108 (e.g., via a secure online interface or by contacting the issuer 110 via a telephone, for example) in order to meet budgetary, lifestyle, fraud/theft prevention, charitable, or other special purposes. For example, in order to reduce the card member's risk related to credit card theft and/or fraud, the card member 100 is able to specify two separate lines of credit 130, 132 within the overall line of credit 138, associated with card transactions relating to different purchase areas. In one embodiment, a purchase area is defined based on a predetermined list of zip codes or townships associated with an originating location of the credit card transaction and/or the shipping address of the merchandise ordered via the Internet. In this embodiment, the card member 100 elects to set the local transaction limit (line of credit 130 associated with purchase area 1) at the maximum amount equal to the overall line of credit 138 (i.e., ten thousand dollars in this case), while limiting the out of area purchases (line of credit 132 associated with purchase area 2) to one thousand dollars. In an alternative embodiment, in the absence of an outside purchase area line of credit 132, the issuing institution 110 automatically increases the limit of the merchandise line of credit 126 when the member is using the credit card 106 a predetermined amount of miles outside of the home purchase area in order to accommodate the travel, dining, and entertainment expenses associated with card member's travel.

To control his or her spending within various purchase categories, the card member 100 is able to set up other special-purpose lines of credit, such as the line of credit 134 associated with purchase type 2, where purchase type 2 is limited to five hundred dollars and falls under the "junk food" category defined via a list of retailers selected by the card member. Likewise, in this embodiment, in order to set the budget for charitable contributions, the card member 100 sets up a special-purpose line of credit 136, set at five hundred dollars and associated with purchase type 3.

In yet another embodiment, the issuing institution 110 and/or the card member 100 create one or more sub-credit lines associated with one or more of the special-purpose lines of credit 122-136 in order to increase the granularity of influence over purchasing patterns associated with the special-purpose lines of credit 122-136. For example, the issuing institution 110 designates one or more sub-credit lines associated with the balance transfer line of credit 122, such as balance transfers to another line of credit, balance transfers resulting from loan payments, and balance transfers associated with other special purposes. Similarly, the issuing institution 110 divides the cash advance line of credit 124 and/or the merchandise line of credit 126 into one or more sub-credit lines associated with special-purpose cash advances and special-purpose merchandise purchases, respectively. Likewise, the card member 110 designates separate sub-credit lines for specific locations within the "outside of home area" line of credit 132. Preferably, the sum of the credit limits associated with all of the sub-credit lines for a given line of credit 122-136 is within the bounds of the credit limit for such line of credit 122-136.

Figure 3:
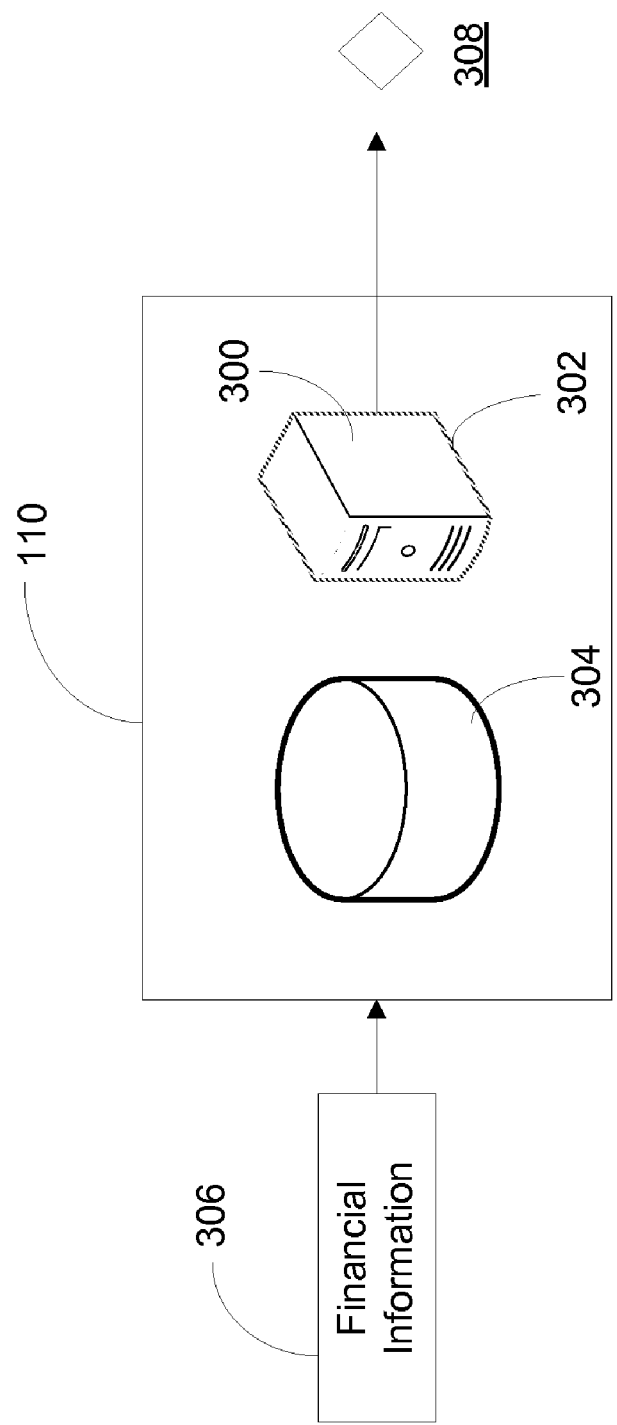
FIG. 3 is a diagram illustrating a business rules engine, in accordance with an embodiment of the invention.

Turning to FIG. 3, an embodiment of a business rules engine 300 is shown in further detail. In an embodiment, the business rules engine 300 resides at the issuing institution 110 and comprises a software application running on one or more computer servers 302 connected to one or more financial information databases 304. The databases 304 receive and store financial information 306 from the issuer/processor 120. The financial information 306, in turn, comprises card member's 100 historical purchase patterns, payment history, credit score, as well as current transaction detail, including merchant and SKU-level data, among other factors. An exemplary business rules engine 300 includes the Blaze Advisor™ application available from the Fair Isaac corporation of 901 Marquette Avenue, Suite 3200, Minneapolis, Minn. 55402. As discussed above in connection with FIG. 2, the business rules engine 300 processes the financial information 306 in accordance with a plurality of predetermined rules/algorithms to determine a suitable adjustment 308 to the one or more specialized lines of credit 122-136, including increasing or decreasing the individual credit limits, creating additional promotional lines of credit, as well as decreasing the limit of the balance transfer credit line to zero when the card member 100 is deemed ineligible for balance transfers based on the financial information 306.

Turning to FIG. 4, an embodiment of a method for administering a plurality of specialized lines of credit is illustrated. In step 400-402, the issuing institution 110 accumulates the card member's payment history and historical purchase patterns in one or more financial information databases 304. Historical purchase pattern information comprises the card member's past purchases by item (SKU-level), purchase type, location, purchase frequency, as well as typical purchase amount per transaction. When the card member 100 is in process of completing a credit card transaction in connection with a purchase of merchandise or services, the issuing financial institution 110 also receives and stores the relevant transaction detail in the one or more databases 304, step 404. In one embodiment, step 406, the issuing financial institution 110 also collects the member's demographic data, such as the information originating from a credit application, including household income, marital status, and the like. Next, the issuing institution 110 determines whether: (a) a balance transfer request has been received from the card member, step 408; (b) the card member is requesting an adjustment in one or more of the specialized lines of credit 122-136 (or in any corresponding sub-credit lines) or a new specialized line of credit (or a sub-credit line) within the account 108, step 410; (c) a new line of credit (or a sub-credit line) or a credit limit increase needs to be implemented in connection with a promotion, step 412; (d) a pending credit card purchase authorization requires an adjustment (e.g., a credit limit increase) in one or more of the specialized lines of credit 122-136 (or in any corresponding sub-credit lines), step 414; or (e) an adjustment is otherwise necessary in connection with periodic analysis of the card member's financial information, step 416. If so, the issuing financial institution 110 applies the rules associated with the business rules engine 300 to the accumulated financial information to determine the necessary adjustment to the card member's lines of credit and/or to approve a balance transfer, limit increase, or a new line of credit requested by the card member. In one embodiment, as discussed above in connection with FIG. 2, the issuing financial institution 110 decreases the limit of the balance transfer line of credit 122 to zero when the card member is deemed ineligible for balance transfers based on the output of the rules engine 300. Finally, in step 420, the issuing financial institution 110 communicates the resulting adjustment and/or a decision on the balance transfer request or on a new line of credit request to the card member.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. For a consumer financial account associated with a credit card having an overall credit line and a plurality of specialized credit lines, each of the credit lines comprising a limit, where a sum of the limits corresponding to each of the plurality of specialized credit lines exceeds the limit of the overall credit line, a method of encouraging particular behavior by the consumer, the method comprising:

receiving, via an electronic payment network, financial information associated with the consumer in an electronic credit transaction request comprising one of a balance transfer request and a purchase transaction request;

storing the electronic credit transaction request including the financial information in a computer readable memory of a consumer database server;

in response to receiving the electronic transaction request, causing a payment processing server to:

(a) process the financial information in the electronic transaction request to determine a suitable adjustment to the financial account for the consumer; and (b) automatically implementing a dynamic adjustment of the limit for at least one specialized credit line associated with the financial account from a first limit to a second limit in accordance with the determined suitable adjustment, wherein the payment processing server adjusts the limit for the at least one specialized credit line independent from the limit of the overall credit line.

2. The method of claim 1 wherein the at least one specialized credit line includes a merchandise credit line, a balance transfer credit line, and a cash advance credit line.

3. The method of claim 1 wherein the at least one specialized credit line includes one or more of a purchase type credit line and a purchase area credit line.

4. The method of claim 1 further comprising adjusting the limit of the at least one specialized credit line from the second limit to the first limit after a previously determined period of time.

5. The method of claim 1 wherein the financial information is received in the course of a request for authorization for a purchase of merchandise, and the suitable adjustment is to increase the limit of a merchandise credit line.

6. The method of claim 1 wherein the suitable adjustment is to decrease the limit of a balance transfer credit line to zero.

7. The method of claim 1 further comprising adding a new specialized credit line responsive to a consumer request.

8. The method of claim 1 further comprising creating at least one sub-credit line for the at least one specialized credit line.

9. The method of claim 8 comprising creating a plurality of sub-credit lines, wherein the sum of the limits corresponding to each of the plurality of sub-credit lines is equal to the limit of the at least one specialized credit line.

10. For a consumer financial account associated with a credit card having an overall credit line and a plurality of specialized credit lines, each of the credit lines comprising a limit, where a sum of the limits corresponding to each of the plurality of specialized credit lines exceeds the limit of the overall credit line, a system for encouraging particular behavior by the consumer, the system comprising:
   a database for storing financial information associated with the consumer, the financial information received in an electronic credit transaction request communicated via an electronic payment network, the electronic credit transaction request comprising one of a balance transfer request and a purchase transaction request;
   a payment processing server having stored thereon computer executable instructions for, in response to receiving the electronic transaction request:
      (a) processing the financial information in the electronic transaction request to determine a suitable adjustment to the financial account for the consumer; and
      (b) automatically implementing a dynamic adjustment of the limit for at least one specialized credit line associated with the financial account from a first limit to a second limit in accordance with the determined suitable adjustment, the payment processing server adjusting the limit for the at least one specialized credit line independent from the limit for the overall credit line.

11. The system of claim 10 wherein the payment processing server further comprises a business rules engine application comprising a plurality of rules for processing the financial information to determine the suitable adjustment.

12. The system of claim 10 wherein the at least one specialized credit line includes a merchandise credit line, a balance transfer credit line, and a cash advance credit line.

13. The system of claim 10 wherein the at least one specialized credit line includes one or more of a purchase type credit line and a purchase area credit line.

14. The system of claim 10 wherein the instructions further comprise adjusting the limit of the at least one specialized credit line from the second limit to the first limit after a previously determined period of time.

15. The system of claim 10 wherein the database receives the financial information in the course of a request for authorization for a purchase of merchandise, and the suitable adjustment is to increase the limit of a merchandise credit line.

16. The system of claim 10 wherein the suitable adjustment is to decrease the limit of a balance transfer credit line to zero.

17. The system of claim 10 wherein the instructions further comprise adding a new specialized credit line responsive to a consumer request.

18. The system of claim 10 wherein the instructions further comprise creating at least one sub-credit line for the at least one specialized credit line.

19. The system of claim 10 wherein the instructions further comprise creating a plurality of sub-credit lines for the at least one specialized credit line, wherein the sum of the limits corresponding to each of the plurality of sub-credit lines is equal to the limit of the at least one specialized credit line.

20. For a consumer financial account associated with a credit card and a plurality of credit lines including an overall credit line and at least one specialized credit line, the at least one specialized credit line comprising a balance transfer credit line, each of the credit lines comprising a limit, a method of managing risk of default on the consumer financial account due to a balance increase associated with the balance transfer credit line, the method comprising:
   receiving, via an electronic payment network, a balance transfer request;
   storing the balance transfer request in a computer readable memory of a consumer database server;
   in response to receiving the balance transfer request, causing a payment processing server to automatically implement a dynamic reduction in the limit for the balance transfer credit line associated with the financial account from a first limit to a second limit, wherein the payment processing server reduces the limit for the balance transfer credit line independent from the limit of the overall credit line.

21. The method of claim 20 wherein the payment processing server decreases the limit of the balance transfer credit line to zero in response to the balance transfer request to manage the risk of default on the consumer financial account.

* * * * *